United States Patent
Jacobs et al.

(10) Patent No.: US 8,098,231 B2
(45) Date of Patent: *Jan. 17, 2012

(54) PORTABLE DEVICE WITH VERSATILE KEYBOARD

(75) Inventors: Paul E. Jacobs, San Diego, CA (US); Steven Mergenthaler, Carlsbad, CA (US); Gad Shaanan, La Jolla, CA (US); Theodore R. Santos, Boulder, CO (US); Jeffrey Swanson, Erie, CO (US); Andrew G. Lejman, Lafayette, CO (US); David Larson, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/886,399

(22) Filed: Sep. 20, 2010

(65) Prior Publication Data

US 2011/0006994 A1    Jan. 13, 2011

Related U.S. Application Data

(63) Continuation of application No. 10/718,125, filed on Nov. 19, 2003, now Pat. No. 7,907,121.

(51) Int. Cl.
    *G09G 5/00* (2006.01)
    *G06F 1/16* (2006.01)

(52) U.S. Cl. ............... 345/168; 345/169; 361/679.56
(58) Field of Classification Search ........... 345/168–179
    See application file for complete search history.

(56) References Cited

U.S. PATENT DOCUMENTS

| | | | |
|---|---|---|---|
| 4,017,725 A | 4/1977 | Roen | |
| 5,434,964 A | 7/1995 | Moss | |
| 5,440,502 A | 8/1995 | Register | |
| 5,477,237 A | 12/1995 | Parks | |
| 6,144,358 A | 11/2000 | Narayanaswamy et al. | |
| 6,149,442 A | 11/2000 | Enright | |
| 6,353,529 B1 | 3/2002 | Cies | |
| 6,397,078 B1 | 5/2002 | Kim | |
| 6,483,445 B1 | 11/2002 | England | |
| 6,492,974 B1 | 12/2002 | Nobuchi | |
| 6,658,272 B1 | 12/2003 | Lenchik et al. | |
| 6,707,664 B2 | 3/2004 | Murphy | |
| 6,850,226 B2 | 2/2005 | Finke-Anlauff | |

(Continued)

FOREIGN PATENT DOCUMENTS

DE    20317865 U1    4/2004

(Continued)

OTHER PUBLICATIONS

International Search Report—PCT/US04/038816. International Searching Authority—European Patent Office, Jun. 9, 2006.

(Continued)

*Primary Examiner* — Duc Dinh
(74) *Attorney, Agent, or Firm* — Nicholas A. Cole

(57) ABSTRACT

An apparatus comprising: a display for presenting information to a user; a housing connected to the display for supporting the display; and a keyboard assembly deployable through a sliding connection to the housing, the keyboard assembly deployable in multiple directions, the information presented to the user through the display is oriented based on deployment of the keyboard assembly, direction of deployment of the keyboard assembly, and input from an application resident on the device. The application prescribes the orientation of the information presented on the display to the user in relation to the direction of keyboard assembly deployment.

15 Claims, 5 Drawing Sheets

A

B

U.S. PATENT DOCUMENTS

| | | |
|---|---|---|
| 7,009,599 B2 | 3/2006 | Pihlaja |
| 7,076,056 B1 | 7/2006 | Lane et al. |
| 7,107,018 B2 | 9/2006 | Jellicoe |
| 7,142,420 B2 | 11/2006 | Santos |
| 7,252,511 B2 | 8/2007 | Santos |
| 2001/0048589 A1 | 12/2001 | Brandenberg et al. |
| 2002/0039074 A1 | 4/2002 | England |
| 2002/0125504 A1 | 9/2002 | Perlov |
| 2002/0191999 A1 | 12/2002 | Katz |
| 2003/0043118 A1 | 3/2003 | Lee |
| 2003/0050019 A1 | 3/2003 | Dowling et al. |
| 2003/0060239 A1 | 3/2003 | Epstein |
| 2003/0064688 A1 | 4/2003 | Mizuta et al. |
| 2003/0081375 A1 | 5/2003 | Yamamoto |
| 2003/0090468 A1 | 5/2003 | Finke-Anlauff |
| 2003/0157971 A1 | 8/2003 | Lieu et al. |
| 2003/0202656 A1 | 10/2003 | Ikeuchi et al. |
| 2004/0207604 A1 | 10/2004 | Chuang |
| 2005/0020325 A1 | 1/2005 | Enger et al. |
| 2005/0070348 A1 | 3/2005 | Lee et al. |
| 2005/0104856 A1 | 5/2005 | Jacobs |
| 2005/0104857 A1 | 5/2005 | Jacobs |
| 2006/0063569 A1 | 3/2006 | Jacobs |

FOREIGN PATENT DOCUMENTS

| | | |
|---|---|---|
| EP | 0618715 A1 | 10/1994 |
| EP | 0927924 A1 | 7/1999 |
| EP | 1312999 | 5/2003 |
| GB | 2333005 A | 7/1999 |
| GB | 2375683 | 11/2002 |
| GB | 2387988 | 10/2003 |
| GB | 2407933 | 5/2005 |
| JP | 61259337 | 11/1986 |
| JP | 62271122 | 11/1987 |
| JP | 63008866 | 1/1988 |
| JP | 2300918 | 12/1990 |
| JP | 11119859 | 4/1999 |
| JP | 2001283300 A | 10/2001 |
| JP | 2001339497 A | 12/2001 |
| JP | 2003125052 A | 4/2003 |
| JP | 2003125053 | 4/2003 |
| JP | 2003179678 A | 6/2003 |
| JP | 2003234809 A | 8/2003 |
| JP | 2003288154 | 10/2003 |
| JP | 2003319044 | 11/2003 |
| JP | 2005216158 A | 8/2005 |
| JP | 2007518155 | 7/2007 |
| WO | 0038332 | 6/2000 |
| WO | WO0177786 | 10/2001 |
| WO | WO2004049150 | 6/2004 |

OTHER PUBLICATIONS

Written Opinion—PCT/US04/038816. International Searching Authority—European Patent Office, Jun. 9, 2006.

International Preliminary Report on Patentability—PCT/US04/038816. The International Bureau of WIPO, Geneva, Switzerland, Jul. 31, 2006.

PORTABLE DEVICE WITH VERSATILE KEYBOARD

CLAIM OF PRIORITY UNDER 35 U.S.C. §120

The present Application for Patent is a continuation of patent application Ser. No. 10/718,125 entitled "A PORTABLE DEVICE WITH. VERSATILE KEYBOARD" filed Nov. 19, 2003, pending, and assigned to the assignee hereof and hereby expressly incorporated by reference herein.

BACKGROUND OF THE INVENTION

1. Field

The invention relates to a portable electronic device. More specifically the invention relates to an electronic device with a sliding retractable keyboard that exposes different key arrangements depending on the direction of keyboard deployment and orients the display in relation to the direction of keyboard deployment.

2. Related Art

Handheld computers, personal digital assistants (PDA's), cellular telephones, MP3 players and similar devices have several characteristics in common. Generally, these devices are battery powered, provide the user with a means of input and output and are required to be small in size. If the device has a display there is generally only one.

Typically the devices are light weight and sized to fit in a pocket. Design restrictions are placed on every component of the device to accomplish the size and weight goals. If a component can be completely eliminated or combined with another component, a large weight and size reduction can be realized.

To eliminate the keyboard, PDA's make use of a touch sensitive screen and pen input system. Handwriting recognition software is used to detect and interpret the meaning of pen strokes. PDA's work reasonably well, however, the advantages of the keyboard for speed and accuracy have not been overcome.

One prior approach is to carry a separate keyboard and connect it to the device when needed. There are several disadvantages in this arrangement which include the need to purchase a separate keyboard, the possibility of mechanical failure due to the repeated inserting and removing of the keyboard connector and the need to carry the keyboard as an extra component. Another prior approach uses a wireless connection means to overcome the mechanical connection failure possibilities. However the other disadvantages of a separate keyboard still persist.

Additional prior approaches have keyboards that retract, when not needed and deploy when needed for input. A traditional alpha-numeric arrangement of keys for a keyboard is referred to as a QWERTY keyboard. This keyboard gets its name from the letters of the first six alphabet keys on the top row reading from left to right. While this is one of the most recognized and used keyboard layouts it imposes restrictions on designers with regard to it dimensions. This traditional keyboard when viewed and used by the user is typically much longer in width than in height. The ratio of this keyboard's dimensions may not be easily adapted to the device as designed.

For example, a device is designed primarily for ergonomics and aesthetics such as a phone. The device design is such that as viewed by the user the length dimension is longer than the width dimension and the width dimension is relatively thin. This device's dimensions directly conflict with the dimensions that are used for a QWERTY type keyboard. That is to say that a keyboard that is wider in relation to height (QWERTY) and as large as the device's real estate can provide would have to be stored 90 degrees to the basic form of the device. Or the keyboard would have to fold or twist about hinges to get the keyboard to rotate 90 degrees so that it is positioned appropriately for the user to use when viewing the screen in the customary way.

Another traditional keyboard that needs to be described and with which many modern users are familiar is a numeric keyboard typically used with phones. The traditional numeric phone keyboard starts on the top row and reads from left to right. In this way there are typically three rows of numbers that include the numbers 1-9 and a fourth row with the number zero and other function keys. Typically within the constraints of a phone keyboard additional function keys can be provided comprising; send, receive, voice-mail and others. Even though there is only a small number of keys required to input a phone number, phones have become smaller and more light weight thus imposing increasingly restrictive constraints on phone style keyboard arrangements.

Because the device is proportioned based on constraints that are not necessarily adaptable to keyboard designs, designers have struggled with size and relative dimensions of these keyboards. Designers have created different key arrangements to try and present the needed keys in dimensions that fit within the given, designed dimensions. Keys in alphabetical order and straight slanted lines have been used. Keys in curved lines have been used. Staggered key arrangements have been used. Keys of various shapes have also been used. The large number of different types of keyboard arrangements presented to the modern user is indicative of the intense struggle by designers to provide the user with a keyboard for inputting information without exceeding the other design restrictions.

Commercial success of a portable electronic device depends in part on the number of devices sold. The device must be "pleasing" to the user to attract the user to becoming a consumer and buy the device. Many factors are involved with creating a "pleasing" device. Intuitive use of the device is one of these factors. If a user can use the device without referencing a user's manual then the device is very intuitive and therefore that portion of use is very "pleasing" to the user. One part of creating an intuitive device is providing the user with traditional input interfaces, such as a traditional QWERTY or a traditional phone style keyboard arrangement. In this way the user is presented with an interface to the device that they are already familiar with.

Another pleasing aspect of a device is quality. A user or purchaser of a device typically will associate quality with structural integrity and will be drawn to devices that display high quality or high structural integrity. If there is weakness or undesirable flexibility in the structural connection used to connect the keyboard to the device the user will associate that weakness or flexibility with poor quality. Therefore to promote commercial success of a portable device it is also important that the device have high structural integrity at the point of keyboard attachment.

Consider now modern hybrid products where a cellular telephone and a PDA are combined into one device. There is the need to provide the user with the ability to use two different keyboard arrangements. To promote commercial success and provide the user with an intuitive device a traditional QWERTY and phone style keyboard needs to be made available to the user. The keyboard must also deploy in such a way as to promote the feeling of high quality or high structural integrity. Each of these keyboards however in their traditional form imposes dimensional restrictions for the designer to overcome.

SUMMARY

According to one aspect of the invention there is provided an apparatus comprising: a display for presenting information to a user; a housing connected to the display for supporting the display; and a keyboard assembly deployable through a sliding connection to the housing, the keyboard assembly deployable in multiple directions, the information presented to the user through the display is oriented based on deployment of the keyboard assembly, direction of deployment of the keyboard assembly, and input from an application resident on the device. The application prescribes the orientation of the information presented on the display to the user in relation to the direction of keyboard assembly deployment.

According to another aspect of the invention there is provided a method for presenting information on a display to a user of a device. The device has a keyboard assembly deployable through a sliding connection. The keyboard assembly is deployable in multiple directions. The method comprising: orienting information presented on the display with reference to deployment of the keyboard assembly, direction of deployment of the keyboard assembly, and input from an application resident on the device. The application prescribes the orientation of the information presented on the display to the user in relation to the direction of keyboard assembly deployment.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION

Figure 1:
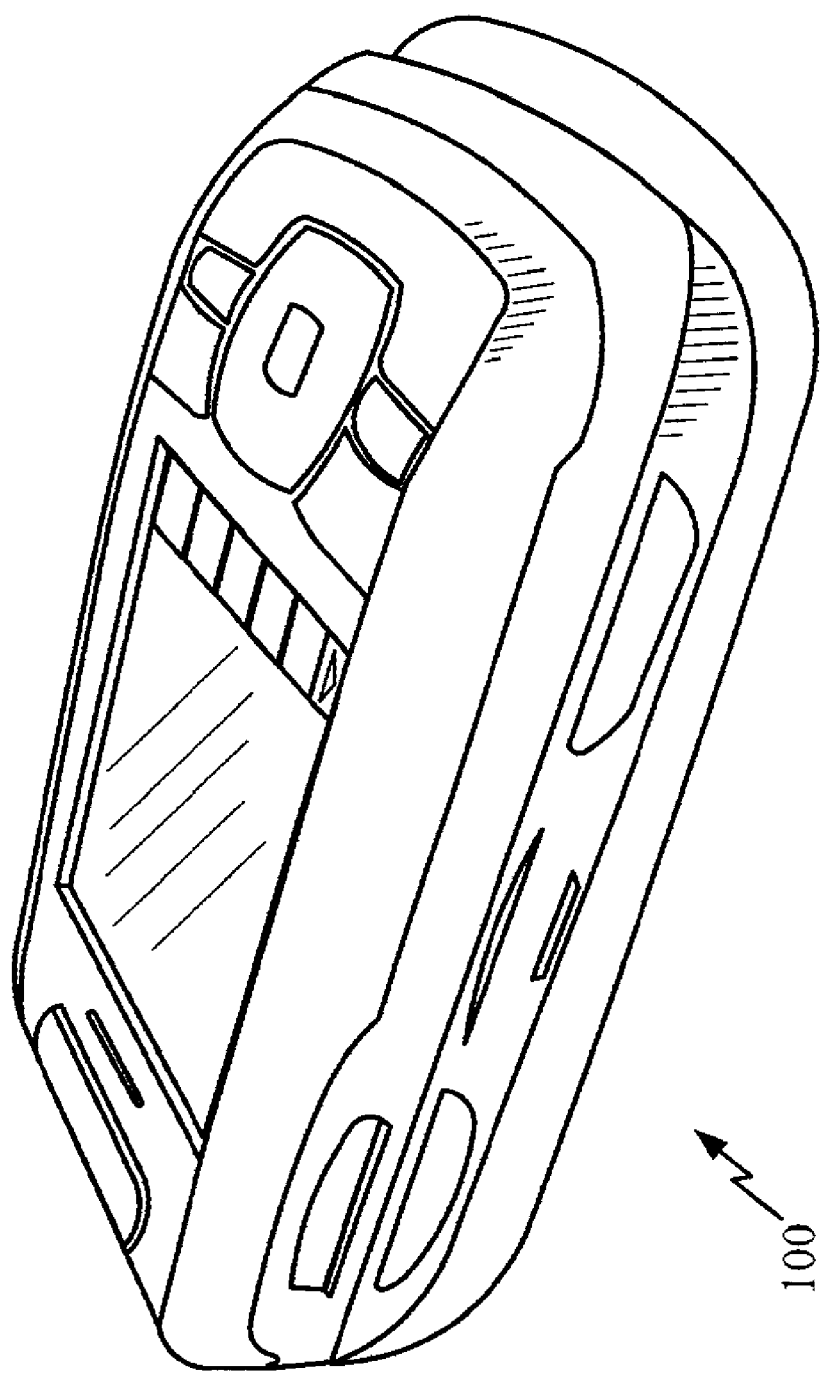
FIG. 1 shows a three dimensional drawing of the device.

Turning now to FIG. 1 of the accompanying drawings there is shown a portable device with versatile keyboard assembly 100. The device 100 is operable in multiple orientations and multiple modes using multiple applications. The discussion will primarily describe the device 100 as operating as a combination phone and PDA. It will be apparent to those of the appropriate skill in the art that a variety of combinations of applications can be incorporated into one device.

The device is especially adaptable for use with BREW™ "Binary Runtime Environment for Wireless" enabled applications. BREW is an application execution platform that runs on firmware targeting wireless applications that can be downloaded and executed on portable devices. The user can listen to music, watch videos, send and receive email, play interactive games from their mobile phone. If there is only one display, as is typical, then the multiple applications will be in competition with one another for use of the single display.

Figure 2:
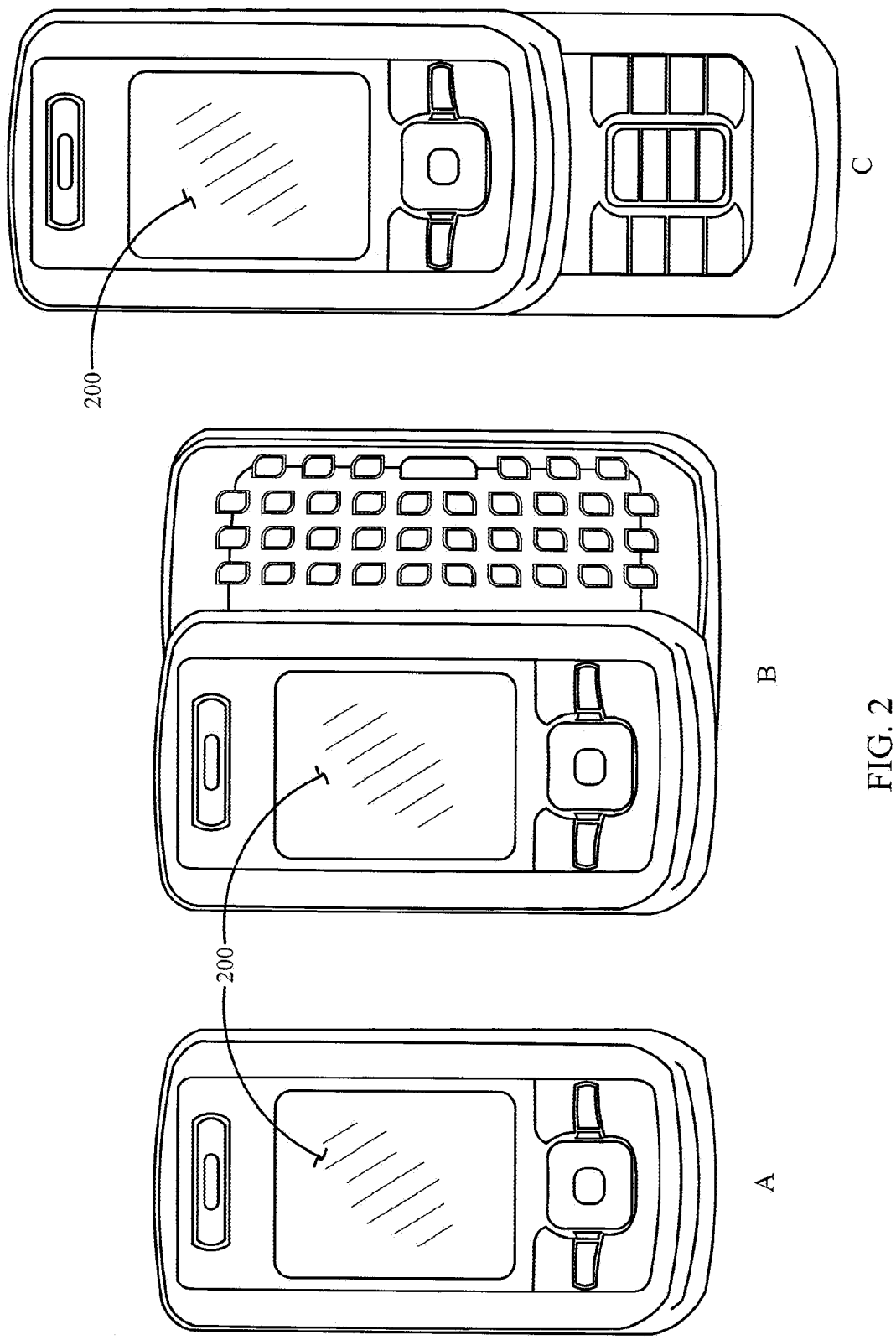
FIG. 2 shows three drawings of the device with the keyboard assembly stowed, deployed with a QWERTY key arrangement and deployed with traditional phone style key arrangement.

In FIG. 2 of the accompanying drawings there is shown the device 100 with the versatile keyboard assembly deployed in three aspects. When the device 100 is closed as in view A the keyboard assembly is concealed and the display 200 remains accessible to the user. When the versatile keyboard assembly is deployed in a lateral direction, as in view B, an area of the keyboard is exposed for use.

Designers have this exposed area available for creating a variety of key layouts. In view B a traditional QWERTY key arrangement is shown and usable to input information when the device 100 is being used as a PDA, for example. Mechanical keys are depicted in view B. However those skilled in the art would appreciate that a variety of input techniques are usable. A touch sensitive screen for example can be positioned in this exposed area for inputting information as well as outputting information.

When the keyboard assembly is deployed, the device 100 references the application software being used, detects whether the keyboard is deployed and if deployed, the relative direction that it is deployed. The device 100 orients the information presented on the display 200 so that it can be properly viewed by the user while inputting information through the keyboard.

Figure 3:
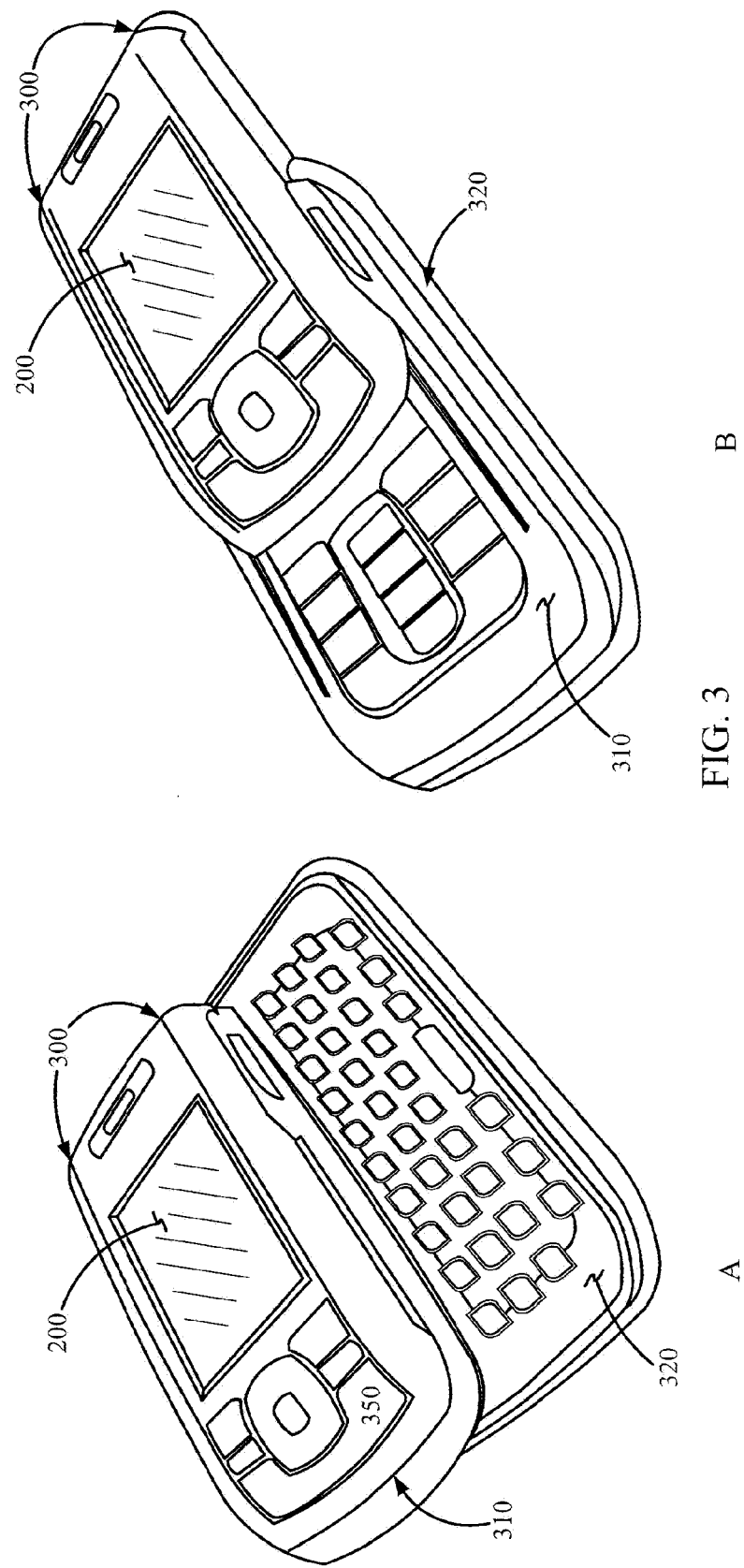
FIG. 3 shows an oblique three dimensional drawing of the device with the keyboard assembly deployed with a QWERTY key arrangement and deployed with a traditional phone style key arrangement.

Generally the orientation of the Information on the display 200 is described as one of two aspect ratios, landscape or portrait. Landscape is described as when the display's width is greater than the height when properly viewed by the user. Portrait is described as when the display's height is greater than its width when properly viewed by the user. It is thus assumed that the display 200 has unequal sides and the discussion is referenced to the dimensional relationship of the display 200 as shown in FIG. 2 or 3.

The keyboard assembly slides in relation to the device 100. This attachment means provides high structural integrity between the keyboard and the display portion of the device 100. High structural integrity is of great importance. A user or purchaser of the device 100, typically will associate quality with structural integrity and will be drawn to devices that display high quality or high structural integrity. The high structural integrity of the sliding keyboard is therefore of great benefit to the commercial success of the device 100.

When the keyboard assembly is deployed down as depicted in view C, an alternate area of the keyboard is exposed. The designer can use this alternate area to create an alternate key layout for use with an alternate application. In view C, a traditional phone key arrangement is shown that is used to input information when the device 100 is being used as a phone. Mechanical keys are depicted in view C. However those skilled in the art would appreciate that a variety of input techniques are usable. A touch sensitive screen for example can be positioned in this exposed area for inputting information as well as outputting information.

When the phone-style keyboard is deployed, the device 100 references the application software being used, detects whether the keyboard is deployed and if deployed, the relative direction that it is deployed. The device 100 orients the information presented on the display 200 so that it can be properly viewed by the user while inputting information through the keyboard.

Since multiple applications may be running at the same time on the device, it is important that the keyboard deployment direction be detected for all directions in relation to all applications. When multiple applications are all competing for time to use the display 200, it could be confusing to the user if information presented on the display 200 is not controlled in relation to the applications running. The information on the display 200 may be oriented in relation to the keyboard with regard to the application being used so that the user has proper viewing.

For example, a user is inputting information in PDA mode using the QWERTY keyboard when a message is received for use with the phone mode. The device may prompt the user to close the keyboard assembly from PDA mode and deploy the keyboard assembly in phone mode. The user may simply stow the keyboard assembly from PDA mode and deploy the keyboard assembly into phone mode. The changes in keyboard assembly deployment are detected by the device and the information displayed on the screen is oriented accordingly for proper viewing.

In another example, similar to view C the phone style keyboard is deployed. However if a third application has been downloaded to the device that uses the traditional phone keys but the information must be presented on the display 90 degrees to the deployment direction of the phone style keys. The information presented on the display 200 is rotated 90 degrees from the traditional orientation in the direction that the third application commands.

In FIG. 3 of the accompanying drawings there is shown alternative three dimensional views of device 100 with the versatile keyboard assembly deployed. View A has the keyboard assembly deployed laterally exposing a traditional QWERTY keyboard. View B has the keyboard assembly deployed down exposing a traditional phone keyboard arrangement. The keyboard assembly is divided into two sections. Section 310 is referred to as the upper portion of the keyboard assembly and section 320 is referred to as the lower portion of the keyboard assembly.

The area 350 represents an area where the two deployments of the keyboard assembly overlap in relation to the display portion of the device. Deployment and direction of deployment of the keyboard assembly may be sensed in this region. Sensing can be accomplished by various mechanisms.

One way of sensing the keyboard movement is by using Hall effect sensors. A Hall effect sensor generates a voltage in relation to the movement of a magnetic field in close proximity to the sensor. The voltage is detected by the device and used as a signal of keyboard deployment. Benefits of using a Hall effect sensor are reliability and no mechanical elements to wear out over time.

In one embodiment, a magnet is positioned in the upper portion of the keyboard 310 and a Hall effect sensor is positioned in the display portion of the device 300. The display portion of the device comprises the display 200 and a housing to support the display. A Hall effect sensor is also positioned in the lower portion of the keyboard 320. The result is reliable determination of keyboard assembly deployment and direction even after many keyboard assembly deployments.

Region 350 may be used for passing through the electrical connections which are made between the display portion of the device and the two portions of the keyboard assembly. There are various ways to make these electrical connections. Generally a flexible means with hard connections provides reliable electronic communications while allowing relative movement between the various components. The device 100 uses flexible circuit material to make these connections.

Figure 4:
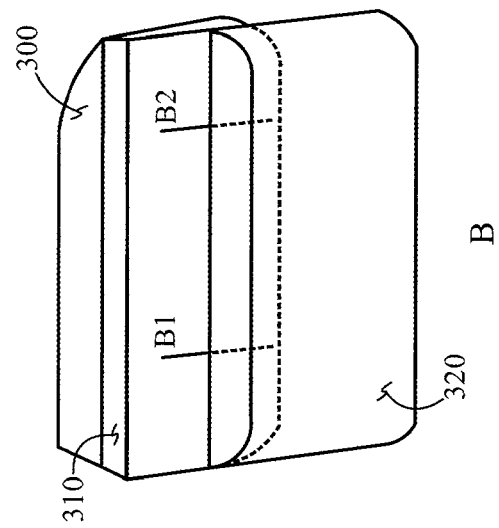
FIG. 4 shows the sliding connection arrangements for the keyboard assembly.
Figure 4:
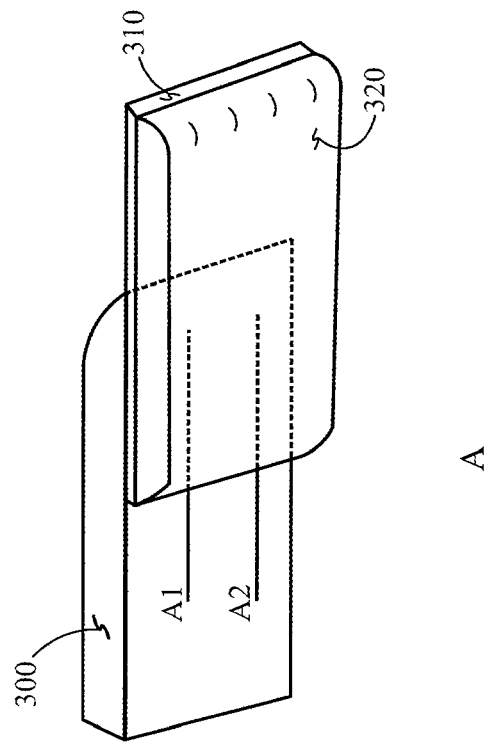

In FIG. 4, there is shown in greater detail the location of the sliding connections for the keyboard. In view A, tracks A1 and A2 represent the locations of the sliding connections made between the display portion of the device 300 and the upper portion of the keyboard 310. The track is connected to the display portion of the device 300 and a carrier (not shown) is connected to the top side of the upper portion of the keyboard 310. In view A, both the upper and lower portions of the keyboard assembly (310, 320) are deployed together which exposes the phone keys to the user.

In view B, tracks B1 and B2 represent the locations of the sliding connection made between the upper portion of the keyboard 310 and the lower portion of the keyboard 320. The track is connected to the bottom side of the upper portion of the keyboard 310 and a carrier (not shown) is connected to the top side of the lower portion of the keyboard 320. In, view B, the lower portion of the keyboard 320 is deployed which exposes the QWERTY keys to the user.

Figure 5:
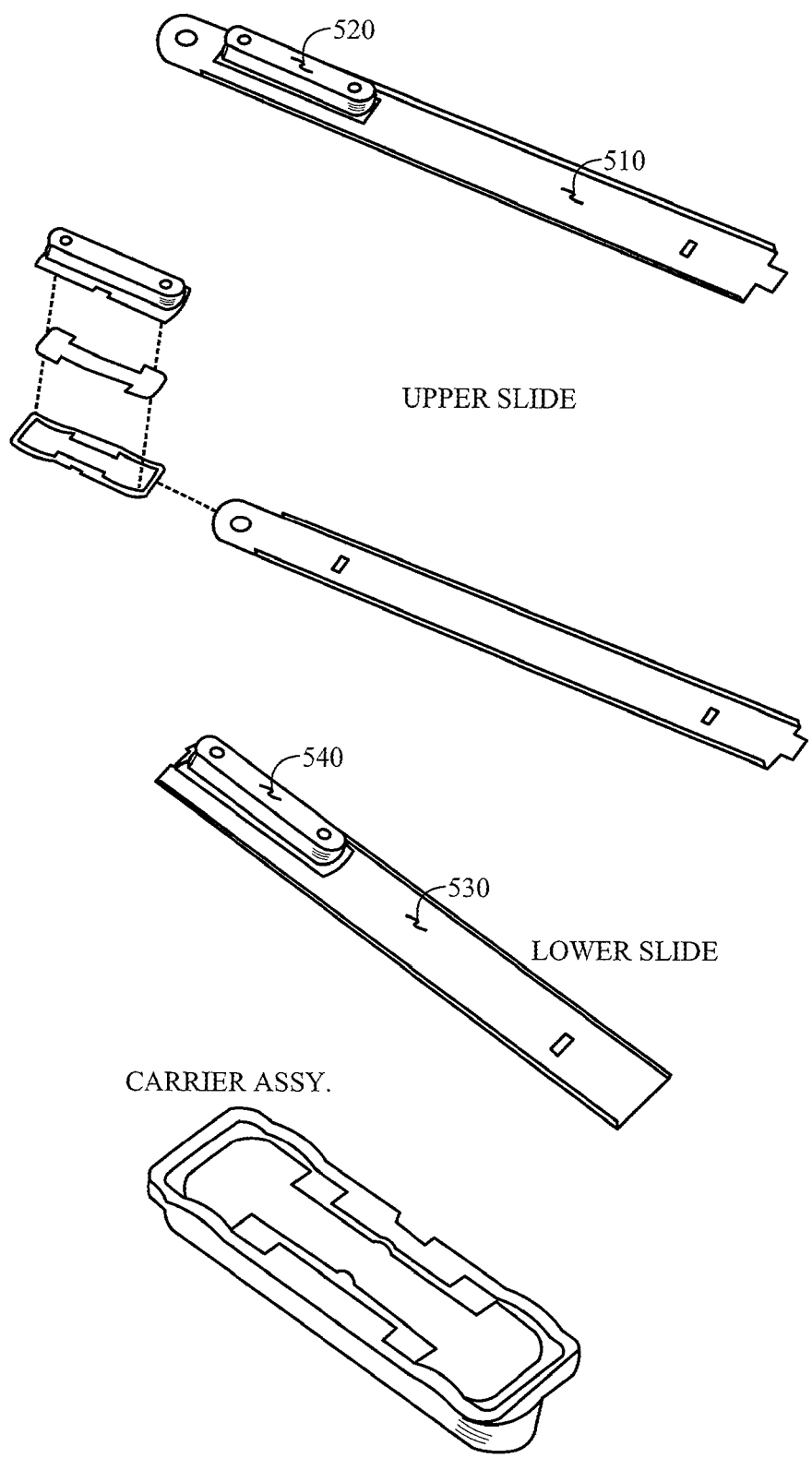
FIG. 5 shows in further detail sliding connection means.

In FIG. 5 there is shown in greater detail a track and carrier mechanism usable in the device 100. The track 510 is attached to the display portion of the device and the carrier 520 is attached to the top side of the upper portion of the keyboard 320. The track 530 is attached to the bottom side of the upper portion of the keyboard 310 and the carrier 540 is attached to the top side of the lower portion of the keyboard 320. Connecting the carriers to the tracks establishes the sliding connections between the various portions of the device.

Turning now to the orientation of the information presented on the display. Multiple applications can be running at the same time in device 100. The orientation of the information presented on the display 200 generally will have a primary aspect ratio in relation to the direction of keyboard deployment. There will be a secondary aspect ratio possible for each keyboard deployment direction. The aspect ratio control comprises user control and the various applications' control. The chart below indicates some of these relationships.

| KEYBOARD STATE | ORIENTATION CONTROL | PRIMARY ASPECT RATIO | SECONDARY ASPECT RATIO |
| --- | --- | --- | --- |
| CLOSED | APPLICATION or USER | LANDSCAPE or PORTRAIT | |
| QWERTY | APPLICATION | LANDSCAPE | PORTRAIT |
| PHONE | APPLICATION | PORTRAIT | LANDSCAPE |

In the closed state, the information presented on the display 200 is presented in landscape or portrait as prescribed by the user, an application or both. In the QWERTY state the orientation of the information on the display 200 is primarily controlled by an application operable with the QWERTY key arrangement and presented in landscape with portrait as optional. In the phone state the orientation of information on the display 200 is primarily controlled by an application operable with the phone key arrangement in portrait with landscape as optional.

In addition to using the keyboard, the user inputs information into the device in various ways. To control the orientation of information on the display 200 the user through a mechanical toggle switch located next to the display selects the desired orientation. The user can provide input to the device through a touch sensitive display screen. Voice recognition methods are also available to the user for inputting user commands to the device. Some of these various ways can be used by the various applications to change orientation of the information on the display 200 based on user input.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

The invention claimed is:

1. An apparatus, comprising:
   means for housing a display for presenting information, the means for housing having a housing bottom surface;
   means for receiving information slidably deployable relative to the means for housing, the means for receiving information comprising a first receiving means and a second receiving means, wherein the first receiving means and the second receiving means are slidably deployable relative to one another, wherein the first receiving means comprises a first receiving arrangement on a first receiving top surface opposite a first receiving bottom surface, wherein the second receiving means comprises a second receiving arrangement on a second receiving top surface, wherein the second receiving arrangement is different from the first receiving arrangement, the means for receiving information deployable relative to the means for housing in a first direction and a second direction, wherein deployment in the first direction presents the first receiving arrangement and deployment in the second direction presents the second receiving arrangement;
   a first means for slidably connecting the means for housing and the first receiving means, wherein the first means for slidably connecting comprises a first track slidably interconnected with a first carrier, wherein a first one of the first track or the first carrier is disposed on the housing bottom surface, wherein a second one of the first track or the first carrier is disposed on the first receiving top surface; and
   a second means for slidably connecting the first receiving means and the second receiving means, wherein the second means for slidably connecting comprises a second track slidably interconnected with a second carrier, wherein a first one of the second track or the second carrier is disposed on the first receiving bottom surface, wherein a second one of the second track or the second carrier is disposed on the second receiving top surface;
   wherein the apparatus comprises a first end and an opposing second end, and a first side and an opposing second side;
   wherein the first carrier is fixed to the first receiving top surface near the first end, and wherein the first receiving arrangement is positioned on the first receiving top surface near the second end;
   wherein the first track is fixed to the housing bottom surface and extends in the first direction;
   wherein the second carrier is fixed to the second receiving top surface near the first side, and wherein the second receiving arrangement is positioned on the second receiving top surface near the second side; and
   wherein the second track is fixed to the first receiving bottom surface and extends in the second direction.

2. The apparatus of claim 1, wherein the first receiving means comprises a QWERTY key arrangement that is presented based on movement in the first direction, and wherein the second receiving means comprises a phone style key arrangement that is presented based on movement in the second direction.

3. The apparatus of claim 1, wherein the device is operable as a PDA and a phone.

4. The apparatus of claim 1, wherein the device is operable in a wireless environment.

5. The apparatus of claim 1, wherein the display comprises a touch sensitive screen.

6. The apparatus of claim 1, further comprising a first Hall effect sensor positioned in the means for housing adjacent to the display, a magnet positioned in the means for receiving information adjacent to the first receiving arrangement, and a second Hall effect sensor positioned in the means for receiving information adjacent to the second receiving arrangement, wherein the first Hall effect sensor and the second Hall effect sensor are operable to respectively determine deployment of the means for receiving information in the first direction and the second direction based on sliding movement relative to the magnet.

7. The apparatus of claim 1, wherein the electrical connections comprise a flexible circuit material.

8. The apparatus of claim 1, wherein the display is operable for presenting the information in a first orientation or a second orientation, wherein the first receiving arrangement corresponds to a first operational mode and wherein the second receiving arrangement corresponds to a second operational mode, wherein the device is operable to generate a prompt to switch between an operating one and a non-operating one of the first operational mode and the second operational mode in response to a received communication corresponding to the non-operating one of the first operational mode and the second operational mode.

9. The apparatus of claim 1, wherein the first receiving arrangement comprises numerical keys and the second receiving arrangement comprises alphabetic keys rotated 90 degrees from the numerical keys, further comprising an operating application using the numerical keys during deployment of the means for receiving information in the first direction, wherein the operating application commands that information presented on the display is rotated 90 degrees from the numerical keys.

10. The apparatus of claim 1, wherein the first track has a first track width that extends in a first plane substantially parallel to a plane of the housing bottom surface, and wherein the second track has a second track width that extends in a second plane substantially parallel to a first receiving means bottom surface plane.

11. The apparatus of claim 1, wherein the first track and the second track each have opposing, longitudinally extending engagement edges, and wherein the first carrier and the second carrier each have opposing, extending flanges respectively slidably engaging the corresponding one of the opposing, longitudinally extending engagement edges.

12. The apparatus of claim 1, further comprising an overlap area defined between the display and the means for receiving information, wherein the overlap area is common to deployment in both the first direction and the second direction, and electrical connections between the display and the first receiving means and between the display and the second receiving means, wherein the electrical connections are disposed in the overlap area.

13. The apparatus of claim 1, further comprising an operating application having a primary aspect ratio and a secondary aspect ratio, wherein the information presented through the display is oriented based on whether the means for receiving information is deployed, a direction of deployment of the means for receiving information, and one of the primary aspect ratio or the secondary aspect ratio.

14. The apparatus of claim 1, further comprising means for orienting the information presented on the display with reference to a user input.

15. The apparatus of claim 1, further comprising means for orienting the information presented on the display with reference to an input from an application resident on the apparatus.

* * * * *